United States Patent Office 3,497,591
Patented Feb. 24, 1970

3,497,591
DENTAL PREPARATIONS CONTAINING
IMIDAZOLE DERIVATIVE
Samuel L. Yankell, Dollard des Ormeaux, Quebec, Canada, Edward Eigen, East Brunswick, N.J., and Sidney Weiss, Levittown, Pa., assignors to Colgate-Palmolive Company, New York, N.Y., a corporation of Delaware
Continuation-in-part of application Ser. No. 392,646, Aug. 27, 1964, and a division of application Ser. No. 672,983, Oct. 5, 1967. This application Nov. 19, 1968, Ser. No. 777,179
Int. Cl. A61k 7/16
U.S. Cl. 424—54     3 Claims

ABSTRACT OF THE DISCLOSURE

A dental preparation effective in countering oral calculus comprising an imidazole derivative such as histidine or histamine. The pH of the preparation is buffered from about 5.4 to about 7.

---

This application is a continuation-in-part of Ser. No. 392,646 filed Aug. 27, 1964, and now abandoned, and a division of Ser. No. 672,983 filed Oct. 5, 1967.

This invention relates to preparations, and particularly to dental preparations effective in countering oral calculus, comprising certain imidazoles. Oral calculus is countered in accordance with the instant invention by removing it or inhibiting its formation from oral plaque.

According to the present invention, improved dental compositions are prepared by the incorporation therein of the imidazole derivative histidine, p-toluene-sulfonyl-L-histidine or histamine.

Typical of such compounds in the dextro, levo, and racemic forms are histidine, sodium salt of histidine, p-toluene sulfonyl-1-histidine (p-tosyl-1-histidine) and histamine. Particularly preferred herein is histidine especially in the form of a mineral acid salt thereof such as the hydrochloride.

The imidazoles contemplated herein are particularly effective in countering oral calculus, as may be demonstrated by determinations made with artificial calculus deposits. Such determinations are shown with illustrative examples given below. Oral calculus is countered by applying to plaque and calculus in the oral cavity a dental preparation buffered to a pH of from about 5.4 to about 7 and comprising an imidazole of the invention.

The dentifrice art is replete with a variety of compositions for cleansing the teeth. Certain ingredients have been incorporated in dental formulations to effect specific results such as bactericides, odor inhibitors, sweeteners, fluorides, etc. The problem of providing a composition capable of preventing calculus which forms in the mouth is well recognized in the field. Calculus is the hard deposit which forms around the teeth and under the gums. If it is not removed, it causes inflammation and eventually leads to periodontal disease.

In the prior art attempts have been made to use additives in dental preparations which would remove calculus deposits. However, some of such additives have had the disadvantage of not only removing the calculus deposit but also tending to decalcify enamel. Others of such additives have avoided the problem of decalcifying enamel, but have substantially reduced effect in removing calculus deposits.

The imidazoles employed in accordance with the instant invention when present in an oral composition buffered to a pH from about 5.4 to about 7 are unexpectedly superior since they are effective in countering oral calculus particularly in its formative stages, when it is not completely calcified or when it is tending to form from plaque. Further, they do not substantially tend to decalcify enamel.

With regard to concentration of an imidazole in the compositions of this invention, an effective amount, typically a minor proportion of from about 0.5 to about 5.5% preferably about 1 to 3% and most preferably 1 to 2% by weight is used.

As indicated, the compositions of this invention are buffered to a pH from about 5.4 to 7 and preferably about 6 to about 7. Suitable buffering materials include ammonia, sodium hydroxide, potassium hydroxide, ammonium carbonate, sodium carbonate, potassium carbonate and other ammonium, sodium and potassium salts, such as chlorides.

The active ingredients described above are used in any preparation, as hereinafter described and claimed, designed for application to the oral cavity, which preparations are referred to herein as dental preparations. Such dental preparations include suitable toothpastes and dental creams, tooth powders, lozenges, tablets, chewing gum, dental floss and the like.

Any suitable practically water-insoluble polishing agent can be admixed with active ingredients described above, in the preparation of the dentifrice compositions such as tooth powders, pastes, creams, and the like. There is a relatively large number of such materials known in the art. Representative materials include, for example, dicalcium phosphate, tricalcium phosphate, insoluble sodium metaphosphate, aluminum hydroxide, magnesium carbonate, calcium sulfate, bentonite, etc. including suitable mixtures thereof. It is preferred to use the water-insoluble calcium or magnesium salts as the polishing agents and, more particularly, calcium carbonate and/or a calcium phosphate, such as dicalcium phosphate dihydrate. In general, these polishing agents will comprise a major proportion by weight of the solid ingredients. The polishing agent content is variable, but will generally be up to about 95% by weight of the total composition. In the case of a dental cream such polishing agents will generally be about 20–75% whereas in tooth powders, the polishing agents will usually be in greater proportion, such as about 70–95%.

In the preparation of tooth powders, it is usually sufficient to mechanically admix the various solid ingredients.

In dental cream formulations, the liquids and solids should necessarily be proportioned to form a creamy mass of desired consistency which is extrudable from a collapsible aluminum or lead tube. In general, the liquids in the dental cream will comprise chiefly water, glycerine, sorbitol, propylene glycol, etc., including suitable mixtures thereof. It is advantageous usually to use a mixture of both water and a humectant or binder such as glycerine or sorbitol. The total liquid content will generally be about 20–75% by weight of the formulation. It is preferred to use also a gelling agent in dental creams such as the natural and synthetic gums and gum-like materials, e.g., Irish moss, gum tragacanth, sodium carboxymethylcellulose, polyvinylpyrrolidone, starch, and the like, usually in an amount up to about 10%, and preferably about 0.5–5% of the formulation.

Mouth washes or rinses are also within the scope of the present invention. Such products are usually an effective amount of an imidazole as described above, dissolved or dispersed in a suitably flavored liquid vehicle, preferably aqueous alcoholic vehicle. The alcohol employed is typically a cosmetically compatible non-toxic alcohol, such as ethanol.

Any suitable amount, preferably up to about 3% of an imidazole can be used. The alcohol concentration can vary depending on the mouth effect desired, such as about 5–70% alcohol, and preferably 5–40%. Liquid dentifrices are also included, such products usually containing a minor amount of active ingredient, usually dissolved or dispersed in an aqueous alcoholic vehicle, preferably containing a mucilaginous material and optionally combined with small amounts of polishing agent, alcohol, glycerine, coloring and flavoring materials.

Various adjuvant materials can be incorporated in such dental preparations. Added materials in the formulation which do not substantially adversely affect the properties and characteristics can be suitably selected and used in proper amount depending upon the particular type of preparation. Such materials may be used as soluble saccharin, flavoring oils (e.g., oils of spearmint, peppermint, wintergreen), coloring or whitening agents (e.g., titanium dioxide), preservatives (e.g., sodium benzoate, etc.), alcohol, menthol, and the like. Various other materials can be added such as higher fatty acid amides of amino carboxylic acid compounds, e.g., sodium lauroyl and palmitoyl sarcosides. Other suitable materials are chlorophyllin and various ammoniated ingredients, such as urea, diammonium phosphate and mixtures thereof.

Activated attapulgite such as described in U.S. Patent No. 3,041,238, can also be used in the imidazole-containing compositions of this invention.

In the case of chewing gum and other products, the active ingredients can be incorporated in any suitable manner during the usual manufacture of the product. For example, they can be incorporated in a warm gum base with stirring to distribute the same uniformly therein. They can also be added to the exterior or outer surfaces of a gum base in order to coat the base. The usual gum bases can be used, representative materials being jelutong, rubber latex, vinylite resins, etc., in addition to other usual materials such as plasticizers or softeners, sugar or other suitable carbohydrates such as glucose, sorbitol, etc.

Other indicated types of compositions will be formulated in known manner also.

Broadly, then, the active ingredients described above can be employed in admixture with a carrier or vehicle of any suitable form, such as a solid, liquid or semi-solid carrier.

The present invention is more fully described and exemplified in the examples below.

The in vitro calculus produced in accordance with Example 3 below, is formed in accordance with the test procedure described in the article by Yankelowitz et al. in the Journal of Dental Research, vol. 44, pages 648–653, 1965. The calculus produced in the example is believed to approximate the conditions prevailing in vivo in higher mammals such as humans when early stages of non-completely calcified calculus is present or tends to form from plaque. The buffer capacity of saliva would not be such as to substantially change the pH from the desired range of about 5.4 to about 7. Thus, a concentration of an additive which is effective in the in vitro procedure would be expected to also exert a beneficial effect in higher mammals when administered regularly to their oral cavities.

The in vivo results set forth in Example 4 below, are determined from the calculus conditions prevailing in animals such as rats which conditions are believed to approximate the conditions prevailing in higher mammals when early stages of non-completely calcified calculus is present or tends to form from plaque. Thus, a concentration of an additive which when swabbed thirty seconds twice daily in the jaws of animals such as rats reduces calculus in such animals, would be expected to also exert a beneficial effect in higher mammals when administered regularly to their oral cavities.

The enamel solubility test conditions set forth in Example 6 below, are analogous to the conditions prevailing in the oral cavities of higher mammals, such as humans, when about the same concentration of a particular additive is contacted regularly with the oral cavity.

It is to be understood that the invention is not to be limited to any specific form of materials or conditions set forth in the examples, but is limited solely by the description in the specification and the appended claims. All parts are by weight unless otherwise specified.

Example 1

A toothpaste was formed in the usual manner and a combination of 1-histidine hydrochloride monohydrate and 1-histidine (free base) was incorporated therein, such that it had the following composition:

| | |
|---|---:|
| Glycerine | 25.86 |
| Sodium carboxymethyl cellulose | 0.60 |
| Sodium saccharinate | 0.20 |
| Sodium benzoate | 0.50 |
| 1-histidine hydrochloride monohydrate | 3.78 |
| 1-histidine (free base) | 1.20 |
| Deionized water | 15.26 |
| Hydrated alumina | 49.80 |
| Sodium N-lauroyl sarcosinate | 2.00 |
| Flavor | 0.80 |
| | 100.00 |

This toothpaste exhibits excellent foaming and detersive power.

The hydrated alumina used in this toothpaste has the following properties:

| | |
|---|---:|
| Average particle size, microns | 2.5±0.5 |
| pH of 20% slurry | 9.2±0.5 |
| Percent $Al_2O_3$, minimum | 64.5 |
| Loss on ignition, percent | 34.5 |

Example 2

A mouth rinse was formed in the usual manner and 1-histidine (free base) was added thereto. The rinse had the composition given below:

| | |
|---|---:|
| Deionized water | 91.715 |
| 1-histidine (free base) | 2.0 |
| Ethanol flavor mixture | 5.0 |
| Polyoxyethylene (Tween 20) (20) sorbitan monolaurate | 0.4 |
| Sodium benzoate | 0.5 |
| Sodium saccharinate | 0.065 |
| Color | 0.32 |
| | 100.000 |

This mouth rinse is effective in reducing calculus.

Example 3

The imidazoles of the invention are effective in countering artificial calculus deposits as shown by the following in vitro test data.

Glass slides were passed mechanically through pooled stimulated saliva containing monocalcium phosphate in a concentration of 0.1% by weight, and air, at a rate of once every two minutes for three hours. During this time interval, simulated or artificial calculus deposits were formed. These in vitro calculus deposits are similar to oral calculus deposits in composition and in X-ray diffraction pattern. The stimulated saliva was obtained by having a group of people chew paraffin wax; the resulting saliva was pooled.

The slides containing the deposits were then passed through a water solution containing a minor percentage of a polycarboxylic acid, with the initial pH of the water solution adjusted to 6.0 with sodium hydroxide solution. After passing a glass slide containing the deposits mechanically through the solution at a rate of 7 times per minute, for 30 minutes, removal of the deposits from the slide was appraised visually. A qualitative rating of 4 or 4+ signifies that a slide is covered with deposits, and that the deposits remained on the slide when so passed through control water. Thus, there is little or no removal of deposits. Successively better ratings are designated 3 (Poor), 2 (Good) and 1 (Excellent). The last value denotes substantially complete removal of deposits. A rating of 1— is indicative of very good deposit removal. A zero value indicates that a slide is free of deposits.

Results of such tests are set forth in Table 1, below.

TABLE 1

| Additive | Additive Conc. Wt. percent | Final Calculus Grading |
|---|---|---|
| Water—Control | | +2 to +3. |
| ETDA Na₂(Ethylene diamine tetraacetic acid di-sodium salt)—Control | 0.4 | 0. |
| Histidine | 0.8 | 0 to +1. |
| p-Toluene-sulfonyl-L-histidine | 0.4 | +1 to +2. |

Thus, the imidazole derivatives reduced calculus from the level present when only water was used, generally about as well as a prior art anti-calculus chelating agent, ethylene diamine tetraacetic acid di-sodium salt.

In vitro calculus samples having particular ratings in accordance with the procedure described above were also formed and the effectiveness of various additives in removing the samples was compared.

Results of such tests are set forth in Table 2, below. These tests were performed at pH 6.0.

TABLE 2

| Additive | Additive Conc. Wt. percent | Visual Rating of Deposits | | |
|---|---|---|---|---|
| | | +2 | +2 to +3 | +3 to +4 |
| L-histidine·HCl | 0.025 | E | F-G | F-G |
| | 0.010 | VG | F-G | F |
| | 0.005 | VG | F | F |
| L-histidine (free base) | 0.05 | E | VG-E | VG |
| D,L-histidine (free base) | 0.05 | E | VG-E | VG |
| p-Tosyl-L-histidine | 0.01 | VG | F-G | F-G |
| D,L-histamine | 0.01 | VG | F | F |
| EDTA-Na₂ | 0.01 | E | G | P |
| | 0.005 | G-VG | F | F-G |

In this table E refers to excellent calculus removal; VG to very good calculus removal; G to good calculus removal; F to fair calculus removal; and P to poor calculus removal.

This, it was observed that the imidazole derivatives of the invention were generally about as effective in countering calculus as the prior art anti-calculus chelating agent, ethylene diamine tetraacetic acid di-sodium salt.

Further tests were made on removing of the in vitro calculus by comparing at pH 6.0, 0.5% L-histidine·HCl solution with 0.1% concentration of solution of L-1-methyl histidine hydrate. L-1-methyl histidine hydrate solution countered calculus even better than the L-histidine-HCl.

Example 4

In order to determine in vivo effect in retarding formation of calculus experiments were conducted with rats fed with a diet causing high calculus formation. One group of five rats was fed with this diet and drank daily up to 14 ml. of a control solution of 0.236% sodium chloride for about one month. A second group of five rats was fed the same diet and drank daily up to the same amount of a solution of 1.35% histidine hydrochloride which corresponds to 1.0% of histidine free base for the same period of time. At the end of the experiment the rats were examined. Specific data observed are set forth in Table 3. The histidine hydrochloride test solution had a pH of 6.0.

TABLE 3

| Group | Mean Calculus Formation | Percent Decrease in Histidine Hydrochloride Group |
|---|---|---|
| Control | 2.3 | |
| Histidine hydrochloride | 0.7 | 69.5 |

It was observed that inclusion of histidine hydrochloride in the diets of rats significantly reduced the tendency of calculus to form.

Example 5

The in vivo effects of the dental preparations of this invention were also determined in humans. A slurry of histidine·HCl of pH 6.25 was incorporated into dental cream A which had a final pH of 6.2 and a slurry of histidine·HCl of pH 5.8 was incorporated into dental cream B which had a final pH of 5.4.

TABLE 3A

| | Percent by Weight | |
|---|---|---|
| Dental Cream Ingredients | Dental Cream A | Dental Cream B |
| Histidine·HCl | 5.4 | 5.4 |
| Insoluble sodium metaphosphate | 35.6 | 35.6 |
| Dicalcium phosphate anhydrous | 5.0 | 5.0 |
| Glycerine | 27.1 | 27.1 |
| Gum tragacanth | 1.4 | 1.4 |
| Sodium benzoate | 0.15 | 0.15 |
| Saccharine | 0.2 | 0.2 |
| Water | 18.02 | 21.02 |
| Sodium hydroxide (4.7 N) | 4.2 | 1.2 |
| Sodium lauryl sulafte | 1.5 | 1.5 |
| Titanium dioxide | 0.4 | 0.4 |
| Flavor and color | 1.03 | 1.03 |

One human subject brushed his teeth with cream A, 3 brushed their teeth with cream B, and 3 brushed their teeth with each of creams A and B. Each brushing was for 44 seconds. At the end of the brushings the plaques at each of four interproximal areas of the upper anterior teeth were checked to determine that the cream and saliva did not affect the pH. Maintenance of the pH between about 5.4 to about 7 is desirable since at this pH range the formation of calculus from the plaque can be inhibited.

The pH observed after 44 second brushing at each interproximal area of each subject with each of creams A and B is indicated below in Table 4.

TABLE 4

| Subject | Cream | pH at Interproximal Area | | | |
|---|---|---|---|---|---|
| | | 1 | 2 | 3 | 4 |
| I | A | 6.9 | 6.9 | 6.9 | 6.8 |
| II | A | 6.5 | 6.4 | 6.6 | 6.4 |
| | B | 5.9 | 5.9 | 5.9 | 5.9 |
| III | A | 7.0 | 6.9 | 6.9 | 7.0 |
| | B | 6.1 | 5.9 | 5.9 | 5.9 |
| IV | A | 6.8 | 6.9 | 6.7 | 6.7 |
| | B | 5.8 | 5.8 | 5.6 | 5.6 |
| V | B | 6.5 | 6.4 | 6.2 | 6.4 |
| VI | B | 5.9 | 5.9 | 5.9 | 5.9 |
| VII | B | 6.1 | 5.3 | 6.3 | 6.3 |

Thus, it was found the conditions in vivo in humans did not detrimentally affect the dentifrice preparations. The pH of plaque after brushing with dental cream A, which prior to use had a pH of 6.2, was in the range of 6.4 to 7.0 and the pH of plaque after brushing with dental cream B which prior to use had a pH of 5.4, was in the range of 5.6 to 6.5. At these pH ranges formation of calculus from the plaque is retarded.

Example 6

The ability of various additives to avoid dissolving the enamel of teeth was determined in enamel solubility studies by contacting 50 ml. of solutions of various concentrations of various additives with 150 mg. of enamel powder (100–200 mesh) for a period of hours at 37° C. The percent amount by weight of enamel dissolved due to a particular concentration of a particular additive is determined by subtracting the percentage dissolved by water. Data obtained with various solutions are indicated in Table 5.

TABLE 5

| Compound | Concentration, percent | | | Time, Hours | | | Percent Weight Loss |
|---|---|---|---|---|---|---|---|
| | 0.01 | 0.1 | 1 | 1 | 19 | 24 | |
| Control (Water) | | | | X | | | 0.6 |
| Do | | | | | X | | 1.1 |
| Do | | | | | | X | 1.4 |
| L-histidine | | | X | X | | | 2 |
| Do | | X | | | X | | 1 |
| Do | X | | | | X | | 0.7 |
| Do | | X | X | | | X | 4.3 |
| Do | | | X | | | X | 1.9–2.6 |
| p-Tosyl-L-histidine | X | | | | | X | 1.5 |
| Do | | | | | X | | 3.7 |
| EDTA di-sodium salt | | | X | | | X | 11.7–12 |
| Do | | X | X | | | | 33 |
| Do | X | | | X | | | 6 |

NOTE.—These tests were performed at pH 6.

It was observed on the basis of the data determined in Table 5 that the percent weight loss of enamel attributed to L-histidine after one hour when the effect of water was subtracted was 1.4% for a 1% solution; 0.4 for a 0.1% solution and 0.1% for a 0.01% solution. It was further observed that the percent weight loss of enamel attributed to L-histidine after twenty-four hours when the effect of water was subtracted was 2.9% for a 1% solution and .5–1.2% for a 0.1% solution. It was further observed that the percent weight loss of enamel attributed to the histidine analogue p-tosyl-L-histidine after nineteen hours when the effect of water was subtracted was 2.6% for a 1% solution and 0.4% for a 0.1% solution. All of the percent weight losses of enamel indicated above in this paragraph as due to imidazoles of the histidine type are of minor significance and indicate substantially no tendency of these compounds to decalcify or etch dental enamel.

It was also observed on the basis of the data determined in Table 5 that the percent weight loss of enamel attributed to EDTA di-sodium salt after one hour when the effect of water was subtracted was 32.4% for a 1% solution and 5.4% for a 0.1% solution. It was further observed that the percent weight loss of enamel attributed to EDTA di-sodium salt after twenty-four hours when the effect of water was subtracted was 10.3–10.6% for a 0.1% solution. All of the percent weight losses of enamel indicated above in this paragraph as due to EDTA di-sodium salt were of major significance in that they indicated a pronounced effect of this type of chelating agent to decalcify or etch dental enamel.

It is noteworthy that the prior art describes EDTA di-sodium salt as a material which is effective in removing calculus but which also macroscopically etches enamel. This was borne out by the above tests set forth in Examples 3 and 6. On the other hand, the imidazoles of this invention, buffered at the desired pH, are generally as effective as the EDTA salt in removing calculus, but are far more desirable since they do not cause undesirable etching of enamel.

The prior art also indicates that substances which are less effective than EDTA salt in removing calculus also have less tendency to etch enamel. A typical example of such a substance is sodium citrate which was said to have little tendency to decalcify or etch enamel.

A 1% solution of histidine at pH 6 was compared in the enamel solubility studies described above with an equimolar solution of sodium citrate at pH 6 after 4 days. The weight loss due to water was 1.9%; due to histidine was 7.0%; a difference of 5.1%, a minor amount after 4 days, and the weight loss due to sodium citrate was 33.5%, a difference of 31.6% a major amount. Thus, it was found that even sodium citrate causes far greater etching of enamel than the imidazoles of the invention.

While the invention has been described in detail according to preferred compositions and preferred conditions for using the same, it will be obvious to those skilled in the art that changes and modifications can be made, without departing from the spirit or scope of the invention, and it is intended in the appended claims to cover such changes and modifications.

What is claimed is:

1. A dental composition buffered to a pH from about 5.4 to about 7 comprising polishing agent and an agent capable of countering oral calculus, said agent being an imidazole derivative selected from the group consisting of histidine, p-tosyl-L-histidine and histamine, said agent being present in an effective amount up to about 5.5% when said agent is histidine, up to about 0.1% when said agent is p-tosyl-L-histidine, and up to about 5.5% when said agent is histamine.

2. A dental preparation defined by claim 1 in the form of a dental cream.

3. A dental mouth wash buffered to a pH of from about 5.4 to about 7 and comprising an aqueous non-toxic alcohol vehicle and an agent capable of countering oral calculus, said agent being an imidazole derivative selected from the group consisting of histidine, p-tosyl-L-histidine and histamine, said agent being present in an effective amount up to about 3% when said agent is histidine, up to about 0.1% when said agent is p-tosyl-L-histidine, and up to about 3% when said agent is histamine

References Cited

Albert, Biochemical Journal, vol. 50, pp. 690–697, 1952.

Grossman, J. Oral Surg., Oral Med., and Oral Path., vol. 7, pp. 484–487, May 1954.

Nicholas et al., J. of Physical Chemistry, vol. 65, pp. 1047–1048, June 1961.

RICHARD L. HUFF, Primary Examiner

U.S. Cl. X.R.

424—273